(12) United States Patent
Rasmussen et al.

(10) Patent No.: US 8,192,779 B2
(45) Date of Patent: Jun. 5, 2012

(54) PRODUCTION OF NATURAL CHEESE PRODUCT

(75) Inventors: Anitha Rasmussen, Viby J (DK); Jens Jorgen Sogaard, Viby J (DK); Mette Bakman, Viby J (DK)

(73) Assignee: Arla Foods Amba, Viby J (DK)

( * ) Notice: Subject to any disclaimer, the term of this patent is extended or adjusted under 35 U.S.C. 154(b) by 840 days.

(21) Appl. No.: 12/026,796

(22) Filed: Feb. 6, 2008

(65) Prior Publication Data
US 2008/0187634 A1 Aug. 7, 2008

Related U.S. Application Data

(60) Provisional application No. 60/899,622, filed on Feb. 6, 2007.

(51) Int. Cl.
*B65D 85/76* (2006.01)
*A23C 19/00* (2006.01)
*A23C 19/06* (2006.01)

(52) U.S. Cl. ............ 426/582; 426/130; 426/39; 426/36; 426/409

(58) Field of Classification Search ............... 426/36, 426/39, 130, 582, 409, 519, 42, 43, 38, 580, 426/34
See application file for complete search history.

(56) References Cited

U.S. PATENT DOCUMENTS

| | | | |
|---|---|---|---|
| 2,251,496 A * | 8/1941 | Parsons | 426/36 |
| 2,963,370 A * | 12/1960 | Roundy | 426/582 |
| 5,709,900 A | 1/1998 | Miller et al. | |
| 5,902,625 A | 5/1999 | Barz et al. | |
| 5,925,398 A | 7/1999 | Rizvi et al. | |
| 6,372,268 B1 | 4/2002 | Silver et al. | |
| 6,440,481 B1 | 8/2002 | Gascoigne et al. | |
| 6,780,445 B1 * | 8/2004 | Rhodes | 426/36 |
| 2002/0122845 A1 * | 9/2002 | Heitmann et al. | 426/36 |
| 2004/0037920 A1 * | 2/2004 | Choulet et al. | 426/36 |
| 2005/0271789 A1 * | 12/2005 | Merrill et al. | 426/582 |

FOREIGN PATENT DOCUMENTS

| | | | |
|---|---|---|---|
| EP | 535728 A2 * | 4/1993 | |
| EP | 1576886 A1 | 9/2005 | |
| EP | 1576886 B1 | 6/2006 | |
| WO | WO 9519699 A1 * | 7/1995 | |
| WO | 0149123 A | 7/2001 | |
| WO | 2006026811 A3 | 3/2006 | |

OTHER PUBLICATIONS

Mullan, W.M.A. (2005). Modelling the grade value of Cheddar Cheese. [On-line]. Available from: http://www.dairyscience.info/index.php/cheese-quality/66-modeling-the-grade-valueof- cheddar-cheese.html.*

Singh et al. "Flavor of Cheddar Cheese: A Chemical and Sensory Perspective.", Comprehensive Reviews in Food Science and Food Safety., vol. 2, 2003, pp. 139-162.*

"Wisconsin Cheese" Jan. 5, 2006 http://web.archive.org/web/20060105042624/www.vernscheese.com/wisconsin_cheese.html.*

Imai, E., Hatae, K. and Shimada, A. (1995) Oral perception of grittiness: Effect of particle size and concentration of the dispersed particles and the dispersion medium. Journal of Texture Studies 26, 561-576.

Brown J.A., Foegeding, E.A. Daubert, C.R., Drake, M.A., and Gumpertz M. (2003) Relationship among rheological and sensorial properties of young cheeses. Journal of Dairy Science 86, 3054-3067.

International Search Report in corresponding PCT/DK2008/000056 dated Apr. 22, 2008.

Supplementary European Search Report and Opinion in corresponding EP08700927 dated May 31, 2011.

* cited by examiner

*Primary Examiner* — Viren Thakur
(74) *Attorney, Agent, or Firm* — Roberts Mlotkowski Safran & Cole P.C.

(57) ABSTRACT

A novel method for producing a natural cheese is described. The present method utilizes a combination of heating, mechanical processing and pH changes to produce a natural cheese.

19 Claims, 1 Drawing Sheet

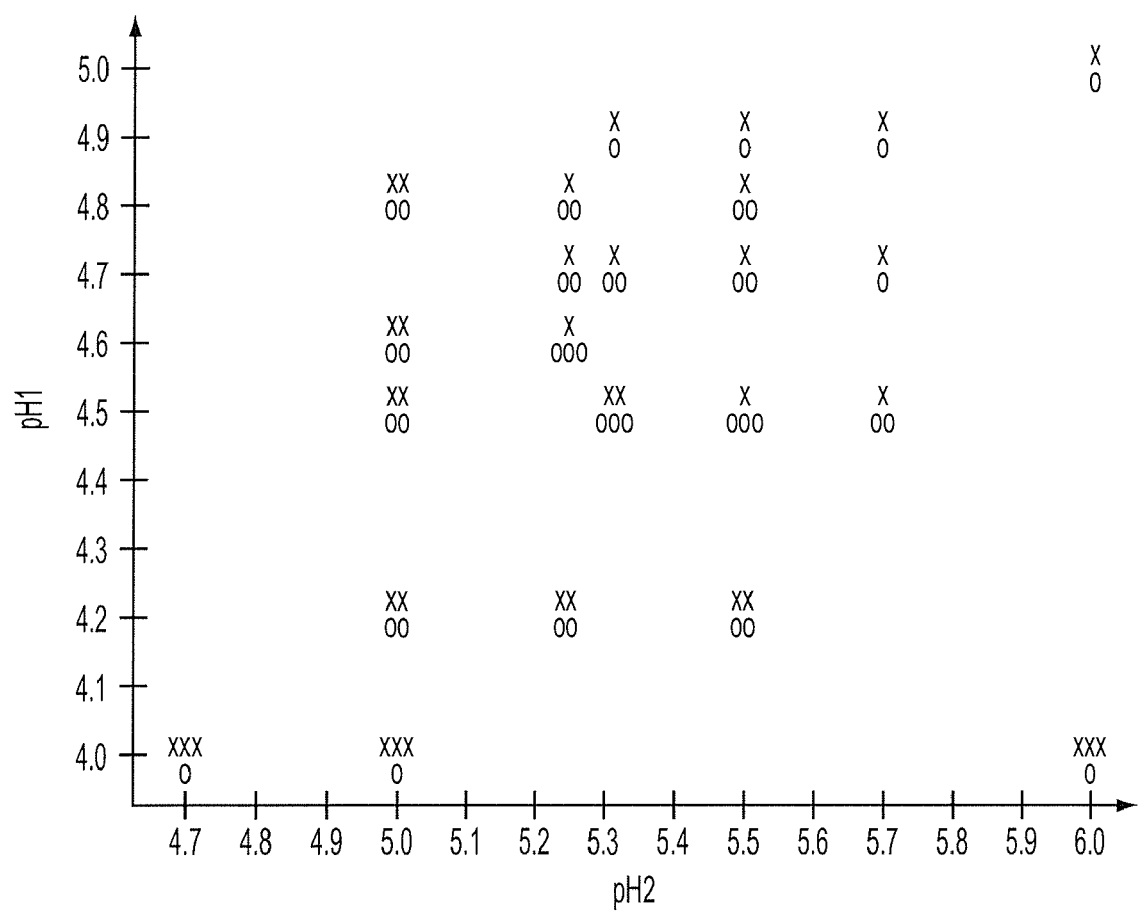

PRODUCTION OF NATURAL CHEESE PRODUCT

CROSS-REFERENCE TO RELATED APPLICATIONS

The present Application claims priority from U.S. Provisional Application No. 60/899,622 filed on Feb. 6, 2007, which is hereby incorporated by reference in its entirety into the present Application.

FIELD OF INVENTION

The present invention relates to natural cheese and a method for producing natural cheese.

BACKGROUND OF THE INVENTION

Natural yellow type cheeses like for example Samso or Gouda are traditionally produced on the basis of pasteurized cow's milk, acidified with lactic acid bacteria into cheese milk. Rennet is added to the cheese milk in order to obtain a coagulum; the coagulum is cut, stirred and heated into cheese curd.

The cheese curd is pressed together to form a coherent mass—a process which can be performed in different ways dependent on what kind of cheese type is produced. For a Samsø type cheese it is first performed below whey and then afterwards without whey. The cheese is then cooled in water for a day and afterwards brined for a day. Subsequently the cheese is matured, a process that for Samsø is performed in foil for 6 to 20 weeks until the right taste has developed.

This production process is very time consuming, primarily due to the long maturation period. This maturation period is however very important in order to achieve the desired taste and in order for enzymes from starter culture as well as enzymes from a possible maturation culture to transform the cheese curd from a rubbery consistency into a firm, supple and delicious consistency.

For the production of pasta filata the cheese curd is heated. This is normally carried out in hot water but processes where the cheese curd is heated with steam have also been described, see e.g. U.S. Pat. Nos. 6,440,481, 6,372,268, EP1576886 and WO2006/026811.

DEFINITIONS

In the present specification, the following terms have the indicated meaning:

The term "natural cheese product" or "natural cheese" means a cheese produced without using emulsifying salts.

Samsø cheese, Gouda cheese, pasta filata cheese and mozzarella cheese is to be understood in accordance with Kosikowski et al (1997).

The term "emulsifying salts" means salts added to cheese in order to dissolve protein for integration of fat, protein and water into a uniform smooth mass. Two major categories of emulsifying salts are citrates and phosphates, e.g. sodium citrate, orthophosphates and polyphosphates. Other types of salts have also been used as emulsifying salts, e.g. sodium lactate and sodium tartrate, but they are less attractive than the citrates and phosphates.

The term "taste ingredient" means ingredients added in order to develop a matured cheese taste in the product. Examples of taste ingredient are mature cheese, powder from mature cheese, fermented milk, isolated fractions from milk, enzyme modified cheese (EMC) etc.

By mature cheese is here to be understood a cheese, which is ripened, cured or matured as described by Kosikowski and Mistry (1997)

Mature cheese powder is powder produced on the basis of a mature cheese that has undergone a spray drying process or a drum drying process.

BRIEF DESCRIPTION OF THE DRAWINGS

FIG. 1 illustrates results of variation in levels of pH set point 1 and set point 2.

SUMMARY OF THE INVENTION

It has surprisingly been found that a natural cheese with a supple, creamy consistency and any desirable taste is obtainable by using equipment traditionally used in production of pasta filata to produce natural yellow type cheeses. According to the invention such a natural cheese can be produced in a very short time as no maturation of this cheese product is necessary. Thus, the cheeses produced are ready to be consumed immediately after production, but they can also be matured like traditional cheeses. Furthermore the cheeses are stable with respect to taste and consistency during the sales period.

The use of steam stretching for mozzarella and other pasta filata type cheeses are well-known and thoroughly tested. In these cheese types a fibrous and rubbery consistency is desirable, which is achievable by the heating and stretching process. The reason for this consistency being desirable is that these cheese types often are heated prior to consumption, e.g. in pizza.

In pasta filata type cheeses intended for cold consumption this fibrous and rubbery consistency can be altered by addition of emulsifying salts as described in e.g. EP1576886 were a mozzarella type string cheese is described which is suitable for cold consumption.

In yellow type cheeses the fibrous and rubbery consistency is not desirable, just as the use of emulsifying salts is not desirable. It has now been surprisingly found that cheese without rubbery and fibrous consistency can be made without addition of emulsifying salts.

In one aspect the present invention provides a method for manufacturing a natural cheese product wherein cheese curd, at least one taste ingredient and at least one acid are mixed and heated in a mixer to a cheese mass having a temperature in the range from 40° C. to 90° C. and a pH in the range from pH 4.2 to pH 5.2, said cheese mass being added a base to bring pH within the range from pH 4.9 to pH 5.8, mixed into a homogenous cheese mass and subsequently packaging the resulting natural cheese product.

In another aspect the present invention provides a method for manufacturing a natural cheese product wherein cheese curd, at least one taste ingredient and at least one acid are mixed and heated in a mixer to a cheese mass having a temperature in the range from 50° C. to 70° C. and a pH in the range from pH 4.5 to pH 4.9, said cheese mass being added a base to bring pH within the range from pH 5.0 to pH 5.6, mixed into a homogenous cheese mass and subsequently packaging the resulting natural cheese product.

BRIEF DESCRIPTION OF THE DRAWINGS

The invention is illustrated in the drawing, where FIG. 1 shows the characteristics in terms of grittiness and dissolubility of a natural cheese prepared according to the process of the invention.

DETAILED DESCRIPTION OF THE INVENTION

In the process of this invention the main ingredient is typically fresh cheese curd. Such fresh cheese curd may have been produced within the last 36 hours, e.g. within the last 24 hours. Alternatively unripe cheese curd which has been frozen or cold-stored can be used. Along with this cheese curd other ingredients, e.g. one or more taste ingredients and at least one acid is added.

Suitable taste ingredient are matured cheese, cheese powder, EMC, fermented milk, other milk based tasty ingredients and mixtures thereof.

In one embodiment the taste ingredient comprises mature cheese.

In another embodiment the taste ingredient comprises the rind of mature cheese.

In yet another embodiment the taste ingredient comprises mature cheese in an amount of 2% to 10% on the basis of combined cheese curd and mature cheese (weight percentage).

In yet another embodiment the taste ingredient comprises mature cheese in an amount of 6% to 10% on the basis of combined cheese curd and mature cheese (weight percentage).

In yet another embodiment the taste ingredient comprises mature cheese in an amount of 3% to 15% on the basis of combined cheese curd and mature cheese (weight percentage).

In yet another embodiment the taste ingredient comprises mature cheese in an amount of 8% to 12% on the basis of combined cheese curd and mature cheese (weight percentage), such as 10% on the basis of combined cheese curd and mature cheese (weight percentage).

Suitable acids for mixing with the cheese curd comprise acids capable of lowering the pH in the cheese mass, e.g. one or more acids taken from the group of hydrochloric acid, acetic acid and citric acid.

Other optional ingredients can be non-milk ingredients like aroma, fruit, meat, spices, salt, nuts and water. Although emulsifying salts are not required in the present method, they can also be added to the mixture.

Acid is added to the ingredients in an amount to bring pH to a value from pH 4.3 to pH 5.1 at the temperature in the range from 40° C. to 90° C. after the ingredients have been mixed.

In one embodiment acid is added to the ingredients in an amount to bring pH to a value from pH 4.5 to pH 4.9 at the temperature in the range from 50° C. to 70° C. after the ingredients have been mixed.

In another embodiment acid is added in an amount to bring pH to a value from pH 4.5 to pH 4.8.

In another embodiment acid is added in an amount to bring pH to a value from pH 4.4 to pH 5.0.

In another embodiment acid is added in an amount to bring pH to a value from pH 4.5 to pH 4.9.

In another embodiment acid is added in an amount to bring pH to a value from pH 4.6 to pH 4.8.

The ingredients are heated by direct addition of stream or by partly or fully indirect heating along with mixing of the ingredients. The ingredients are heated to a temperature from 40° C. to 90° C., or from 50° C. to 70° C., such as from 54° C. to 60° C.

During or after heating the pH may be measured and if necessary it may be adjusted and followed by further mixing to reach homogeneity. After having reached the desired first pH setpoint the cheese mass is once again adjusted with respect to pH to reach a second pH setpoint. This time pH is increased by adding a base in order for pH to be from pH 5.0 to pH 5.6 following mixing to homogeneity.

In one embodiment of the invention, said pH in the range from pH 4.3 to pH 5.1 is at least 0.5 pH units lower than said pH within the range from pH 5.0 to pH 5.6.

In another embodiment of the invention, said pH in the range from pH 4.5 to pH 4.9 is at least 0.5 pH units lower than said pH within the range from pH 5.0 to pH 5.6.

In another embodiment base is added in an amount to bring pH to a value in the range from pH 5.1 to pH 5.6.

In another embodiment base is added in an amount to bring pH to a value in the range from pH 5.2 to pH 5.5.

After the final mixing to a uniform cheese mass the cheese is formed, packed and cooled.

The cheese can be brine-salted if the full amount of salt has not already been added. After being brined the natural cheese product is packaged.

If the cheese is not brined it is preferable to package the natural cheese product before being cooled to a temperature below room temperature. In this case, the packaged cheese is placed in a cold storage for cooling the product.

The natural cheese produced by the present invention is a cheese with a creamy consistency and it may have any desirable taste. The taste of the natural cheese product depends on the at least one taste ingredient which is added to the mixture. The cheese can be ready for consumption immediately after production and subsequent cooling.

It is very surprising that by combining the heating process, pH control and the ingredients used a cheese that does not require maturing and with matured taste can be produced. The cheese product differs pronouncly from other cheeses produced on the basis of heating because it can be produced without rubbery, fibrous texture and emulsifying salts.

In another aspect the present invention provides a natural cheese product manufactured by a process wherein cheese curd, at least one taste ingredient and at least one acid are mixed and heated in a mixer to a homogeneous cheese mass having a temperature in the range from 40° C. to 90° C. and a pH in the range from pH 4.3 to pH 5.1, said homogeneous cheese mass being added a base to bring pH within the range from pH 5.0 to pH 5.6, subsequently packaging the resulting natural cheese product.

In another aspect the present invention provides a natural cheese product manufactured by a process wherein cheese curd, at least one taste ingredient and at least one acid are mixed and heated in a mixer to a homogeneous cheese mass having a temperature in the range from 50° C. to 70° C. and a pH in the range from pH 4.5 to pH 4.9, said homogeneous cheese mass being added a base to bring pH within the range from pH 5.0 to pH 5.6, subsequently packaging the resulting natural cheese product.

In one embodiment said natural cheese product is packaged before being cooled to a temperature below room temperature.

In another embodiment no emulsifying salts have been added during manufacture of the natural cheese product.

In yet another embodiment, heating has been carried out in a direct steam injection mixer.

The present invention is further illustrated in the following examples which are, however, not intended to limit the scope of the invention in any way.

EXAMPLES

Example 1

The Purpose of this Experiment is to Produce a Cheese According to the Method of the Present Invention 24 hours old bacteriological acidified cheese curd with pH 5.25 is loaded into a double-screw direct steam injection mixer/cooker (e.g. Almac FV500 from Almac s.r.l., Modena, Italy). Together with the cheese curd, 6 weeks old rindless Samsø (45% f.d.m) and salt is added. The ingredients are briefly mixed. HCl is added in order to obtain a pH in the range from 4.6 to 4.9 and the heating and mixing starts.

The ingredients are heated to 55° C. with direct steam injection and simultaneous mixing at 80 rpm, whereafter the steam injection stops. pH is measured and if necessary it is regulated in order to obtain pH within the range from 4.6 to 4.9. If acid is added the ingredients are mixed again.

After the correct low pH is obtained, NaOH is added to obtain a pH in the range from 5.0 to 5.6 and mixing is performed again at 80 rpm and 55° C. After this last mixing the cheese mass has become homogeneous and can be transformed into blocks, vacuum packed and cooled on storage.

It appears that the resulting product is natural cheese product tasting like a mild Samsø cheese and that it has a soft and creamy consistency.

Example 2

This Example Divides into a Series of Experiments and the Purpose Hereof is to Produce Natural Cheeses by Methods According to the Invention with Various Characteristics as a Result of Different Production Conditions 24 hours old bacteriological acidified cheese curd with pH 5.25 is loaded into a double-screw direct steam injection mixer/cooker (e.g. Almac FV500 from Almac s.r.l., Modena, Italy). Together with the cheese curd a certain amount of salt is added. The ingredients are briefly mixed. Acid is added in order to obtain a certain pH (named pH setpoint 1) and the heating and mixing starts.

The ingredients are heated to a certain temperature with direct steam injection and simultaneous mixing at 80 rpm, and immediately thereafter the steam injection is stopped and pH is measured as setpoint 1. If necessary in order to obtain pH setpoint 1 as desired, acid is added and the ingredients are mixed again.

After a desired pH setpoint 1 is obtained, NaOH is added to increase pH to a certain level (named pH setpoint 2) and mixing is performed again at 80 rpm, until it has become visually homogeneous. The product can now be transformed into blocks, vacuum packed and cooled on storage.

The cheese is then sensory evaluated wherein grittiness and dissolubility in the mouth are preferred parameters.

The sensory evaluation is performed according to Imai et al. (1995) with respect to grittiness and according to Brown et al (2003) with respect to grittiness and dissolubility which they define as "chewdown degree of breakdown".

FIG. 1 shows the results of variation in levels of pH setpoint 1 and 2, where the evaluation has been made in relation to grittiness (x) and dissolubility (o). Grittiness evaluation is from x=smooth to xxx=very gritty. Dissolubility evaluated is from o=crumble to ooo=melts in the mouth.

From FIG. 1 it appears that preferred combinations are within pH 4.4-pH 4.8 with respect to pH setpoint 1 (pH1) and from pH 5.1 to pH 5.6 with respect to pH setpoint 2 (pH2).

References

Kosikowski, Frank V. and Mistry, Vikram V. (1997) Cheese and fermented milk foods, volume 1, Origins and Principles. Third Edition. F. V. Kosikowski, L.L.C., Connecticut.

Imai, E., Hatae, K. and Shimada, A. (1995) Oral perception of grittiness: Effect of particle size and concentration of the dispersed particles and the dispersion medium. Journal of Texture Studies 26 (5), 561-576.

Brown J. A. Foegeding E. A., Daubert C. R., Drake M. A. and Gumpertz M. (2003) Relationship among rheological and sensorial properties of young cheeses Journal of Dairy Science 86, 3054-3067.

The invention claimed is:

1. A method for manufacturing a natural cheese product comprising mixing and heating in a mixer cheese curd, at least one taste ingredient and at least one acid to produce a cheese mass having a temperature in the range from 40° C. to 90° C. and a pH in the range from pH 4.2 to pH 5.2, adding to said cheese mass having pH of 4.2 to 5.2 a base to bring pH within the range from pH 4.9 to pH 5.8, mixing said cheese mass into a homogeneous cheese mass and subsequently packaging the resulting natural cheese product.

2. A method according to claim 1, wherein the cheese curd, the at least one taste ingredient and the at least one acid are mixed and heated in a mixer to produce a cheese mass having a temperature in the range from 50° C. to 70° C. and a pH in the range from pH 4.5 to pH 4.9, adding to said cheese mass having pH of 4.5 to pH 4.9 a base to bring pH within the range from pH 5.0 to pH 5.6, mixing said cheese mass into a homogeneous cheese mass and subsequently packaging the resulting natural cheese product.

3. A method according to claim 1, wherein the mixing and heating are carried out in a direct steam injection mixer.

4. A method according to claim 1, wherein the heating is carried out by indirect heating using either steam or hot water.

5. A method according to claim 1, wherein said homogeneous cheese mass has a temperature in the range from 54° C. to 60° C.

6. A method according to claim 1, wherein said natural cheese product is cooled in brine before being packaged.

7. A method according to claim 1, wherein said natural cheese product is packaged before being cooled to a temperature below room temperature.

8. A method according to claim 1, wherein said at least one taste ingredient comprises mature cheese.

9. A method according to claim 1, wherein said at least one taste ingredient comprises the rind of mature cheese.

10. A method according to claim 8, wherein said mature cheese is added in an amount of 3% to 15% on the basis of the cheese curd.

11. A method according to claim 1, wherein said at least one taste ingredient comprises cheese powder, EMC, fermented milk or another milk based taste ingredients.

12. A method according claim 1, wherein said cheese curd is no more than 36 hours old.

13. A method according to claim 1, wherein said pH in the range from pH 4.2 to pH 5.2 is at least 0.5 pH units lower than said pH within the range from pH 4.9 to pH 5.8.

14. A method according to claim 2, wherein said pH in the range from pH 4.5 to pH 4.9 is at least 0.5 pH units lower than said pH within the range from pH 5.0 to pH 5.6.

15. A method according to claim 1, which produces a natural yellow cheese product.

16. A method according to claim 8, wherein said mature cheese is added in an amount of 2% to 10% on the basis of the cheese curd.

17. A method according to claim 8, wherein said mature cheese is added in an amount of 6% to 10% on the basis of the cheese curd.

18. A method according to claim 8, wherein said mature cheese is added in an amount of about 10% on the basis of the cheese curd.

19. A method according to claim 1, wherein the resulting natural cheese product has creamy consistency, and mature cheese taste, without having been subjected to a cheese maturing process, and the resulting natural cheese product lacks rubbery fibrous texture and emulsifying salts.

* * * * *